Feb. 13, 1968  M. W. PHILLIPPS  3,368,831
COUPLING DEVICE
Original Filed Sept. 23, 1963
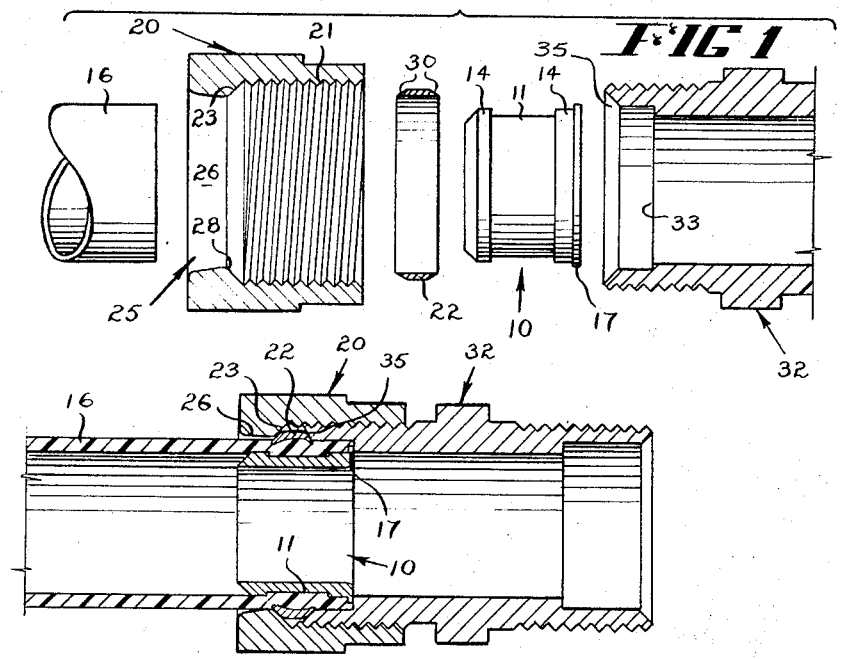
FIG 1
FIG 2
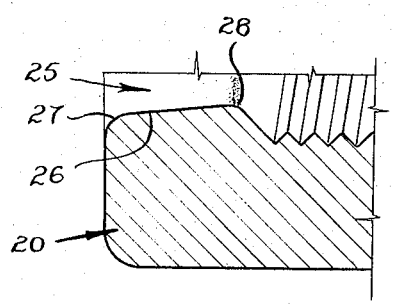
FIG 3
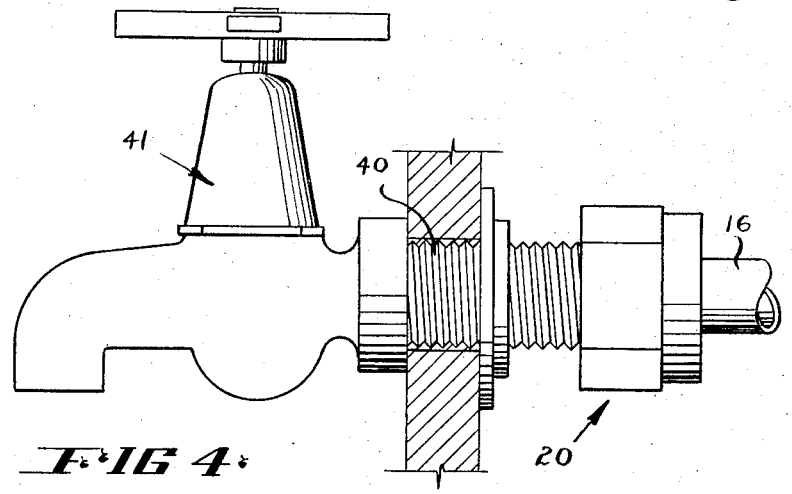
FIG 4

United States Patent Office 3,368,831
Patented Feb. 13, 1968

3,368,831
COUPLING DEVICE
Malcolm W. Phillipps, Hilton, South Australia, Australia, assignor to Philmac Limited, Hilton, South Australia, Australia
Continuation of application Ser. No. 310,621, Sept. 23, 1963. This application Nov. 25, 1966, Ser. No. 597,176
1 Claim. (Cl. 285—249)

ABSTRACT OF THE DISCLOSURE

A coupling device for use with deformable pipe, such as plastic, rubber or soft metal tubing, has an inner sleeve to be inserted in the pipe. This sleeve has a circumferential groove on its outer surface. The arrangement provides for positive positioning of a continuous sealing ring relative to the groove and pipe material, with the groove having greater axial length than the ring. Complementary screw threaded members coact to deform the ring inwardly to achieve a particular configuration of the pipe material, ring and groove, with a resulting superior coupling performance.

---

This application is a continuation of application Ser. No. 310,621 filed Sept. 23, 1963, and now abandoned.

This invention relates to a coupling device suitable for easy connection to a pipe of deformable material, for example, a plastic or rubber hose or soft metal tube.

The main object of the invention is to provide a device which can be used for joining lengths of pipe of deformable material end to end, or to fittings (elbows, T's etc.), or to conventional water or gas lines.

In its simplest form the invention can be said to consist of a pair of complementary screw threaded members, a deformable sealing ring of inner diameter engageable on the outer surface of the pipe to be connected and positionable within one of said screw threaded members, annular abutments on each said screw threaded member engageable against the sealing ring operable to deform said sealing ring inwardly on said pipe when disposed thereon upon said screw members being tightened together, and a sleeve slidable within said pipe to be connected, said sleeve having a single circumferential groove engageable by the inner surface of said pipe upon inward deformation thereof by said sealing ring.

The device of this invention can be used as a union coupling at each joint, and to provide a simple and positive attachment between length and length of pipe of the same or dissimilar deformable material or between deformable pipe and pipe fittings, and may be detached with ease and without injury to tubes or fittings.

Various types of connection means have been employed and some are complicated, difficult to fit and disassemble, and most involve the expansion of the pipe, which in many cases requires heating of the tube. It will immediately be seen that this device is simple, easy to fit and disassemble, and requires no expansion or any heating of the pipe.

Two embodiments illustrating the invention are described hereunder in some detail with reference to and are illustrated in the accompanying drawings, in which:

FIG. 1 is an "exploded" sectional view showing the components forming a coupling device before assembly to a pipe of deformable material.

FIG. 2 shows same when assembled.

FIG. 3 is an enlarged view showing the configuration of the nut mouth, and

FIG. 4 is a side view showing a second embodiment.

According to the first embodiment of FIG. 1, a short sleeve 10 is provided with a shallow annular groove 11.

The sleeve 10 has an exterior diameter 14 of convenient size to constitute a "slip in" fit when pressed into the interior bore of a pipe 16 of deformable material, without significant deformation of the pipe. The pipe may be of hard plastic, soft plastic or rubber hose or a soft metal tube. A small shoulder 17 on an end of the sleeve engages the end of the pipe or hose 16 thereby fixing the location of the groove 11 relative to the pipe end. The nut 20 has a thread 21 of convenient size, and has sufficient clearance to accommodate a sealing ring 22 and is provided with a conical abutment 23 adjacent to its base, the conical surface of which is at about 45° angle with the axis of the tube. The mouth 25 of the nut 20 has an outwardly diverging taper 26 terminating at its outer end in a radius 27 (see FIG. 3) and at its inner end in a radiused portion 28 of suitable size to enable it to be placed over the end of the pipe 16. The sealing ring 22, which in this embodiment is of soft copper, is then placed over the pipe 16.

The sealing ring 22 is made of a length of little less than the length of the groove 11 in the grooved sleeve 10, and of inner diameter a slight clearance so as to be a sliding fit over the outside of the pipe 16, and has its ends 30 of conical shape with the cone surfaces disposed at about 30° angle with the axis of the ring.

A double-ended hexagon nipple 32 is shown in this embodiment as a union for attaching length to length, but the nipple may be screwed into or replaced by an elbow, T, cross, valve or other conventional fitting.

The nipple 32 (or other fitting) is generally of conventional type excepting that it is furnished with a convenient counterbore terminating in a shoulder 33 of suitable diameter to receive the pipe 16 and of a depth to position the sealing ring 22 centrally over the groove 11 (see FIG. 2). The nipple (or fitting) is furnished with a bevel or chamfer of about 45° at its mouth forming a conical abutment 35.

As the fitting into which the tube is inserted is provided with a counterbore of a length which determines the depth to which the tube is inserted, the sealing ring is positioned in the correct location by the nipple and nut bevels to enable it to be compressed together with the deformable material of the pipe 16 into the groove of the sleeve.

The method of application of the device is as follows; and applies equally to plastic pipe, plastic or rubber hose with a small variation for metal tube. In the following explanation the word "pipe" includes the first three.

Having cut a pipe 16 to the required length, preferably squarely at right angles to its axis, the short metal sleeve 10 is pushed inside the pipe until the shoulder 17 engages the end of the pipe 16.

The fitting 32 to be jointed is first assembled by placing the sealing ring 22 and nut 20 in position on the nipple and tightening "finger tight." This holds the sealing ring 22 firmly between the bevels of the fitting 32 and nut 20 so that its bore is parallel to the axis of the fitting 32. The pipe with sleeve is then inserted into the assembled fitting 32 until the flange of the internal sleeve 10 rests against the shoulder 33.

The nut is then tightened on the fitting and as it is tightened the sealing ring 22 is engaged at one end by the conical abutment 23 in the nut 20 and at its other end by the conical abutment 35 of the nipple 32 (or other fitting).

Provided the pipe has been inserted into the fitting to the bottom of the counterbore, the inner grooved tube is designed so that the further tightening of the coupling nut causes the form of the sealing ring to change, thereby compressing the pipe into the groove or grooves forming a tight seal on the pipe between the inner grooved sleeve 10 and the sealing ring 22. At the same time the sealing ring becomes a metal to metal joint means between the fitting and the coupling nut or bush, the distortion of shape of the sealing ring 22 tending to change its cross-sectional shape into a crescent shape due to the pressure exerted by the 45° abutments on the 30° conical surfaces on the sealing ring (see FIG. 2).

The sealing ring becomes fixed permanently on to the pipe, and the pipe permanently into the groove of the sleeve due to compression of the sealing ring. Having compressed the sealing ring on to the pipe it then becomes the seal between the nipple 32 and the nut 20.

FIG. 3 illustrates the shape of the mouth 25 of the coupling nut 20. Since the outside diameters of pipes made by different manufacturers may vary slightly, it is desirable that the nut should have a "lead in" to facilitate positioning over the end of the pipe, and it is found in practice that a suitable angle of the outwardly diverging taper 26 is about 5° relative to the axis (10° included angle).

FIG. 4 shows a typical application of the invention, wherein a nut 20 secures a pipe 16 to the threaded counterbored tail 40 of a tap 41. The configuration of the inner surface of the tail 40 of course needs to be similar to that described and illustrated with reference to the nipple 32, and includes an abutment at the mouth, and a counterbore terminating in a square shoulder.

A consideration of this invention will indicate that it provides a joint which may be assembled or disassembled at will, easily and without injury to the pipe or sealing ring. As an example, an elbow can be changed to a T, cross or valve. Conventional fittings may be employed by screwing one end of the nipple into the conventional fittings, or the fittings may be produced incorporating the counterbored portions below the threads to receive the plastic or other pipe, but this does not interfere with other normal attachment of threaded pipe, fittings, valves or the like.

A metallic jointing means is provided for the attachment of plastic pipes, plastic or rubber hose or soft metal tubes to extend their lengths, to attach one to another or to conventional fittings either of similar or reduced sizes, or to fluid mains, or for electrical conduit connection to junction or terminal boxes in the case of the pipe being used as a conduit.

The positioning of the groove or grooves on the inner sleeve is such that provided the pipe or tube is inserted to the bottom of the counterbore of the nipple or other fitting, the tightening of the coupling nut will automatically position the location of the sealing ring or rings, so that on tightening it will seal the pipe, hose, or tube to the sealing ring or rings and the ring will also constitute a joint between the coupling nut or bush and fitting assembled or disassembled with ease at each and every joint at will. A copper seal is usually preferable, constituting a metal to metal joint, but it will be seen that some metal alloys or certain plastics or rubber are also suitable.

What I claim is:

1. A coupling device suitable for connection to a pipe of deformable material comprising:
   (a) a pair of complementary screw threaded members, one of the screw threaded members being slidable over the pipe and the other screw threaded member having a counterbore terminating at its inner end in a shoulder;
   (b) a deformable continuous sealing ring of inner diameter freely slidable along the outer surface of the pipe to be connected and positionable within one of the said screw threaded members, with the outer surface of said ring terminating in an annular conical face at each end;
   (c) annular conical abutments on each said screw threaded member engageable against both ends of the sealing ring with the cone angle of each said conical face of said ring being less than the cone angle of each said annular conical abutment, so that said sealing ring will deform inwardly on said pipe when disposed thereon upon said screw members being tightened together; and
   (d) a sleeve slidable within said pipe to be connected, said sleeve having a single circumferential groove of axial length exceeding the axial length of the ring, the groove being in the outer surface of said sleeve, said sleeve terminating in a flange at one end, the flange being positioned within said counterbore adjacent the shoulder thereof and also abutting the end of the pipe thereby locating said groove within said pipe in radial alignment with said sealing ring, said pipe sealably engaging within said groove and also sealably engaging said sealing ring upon inward deformation thereof by said sealing ring.

References Cited

UNITED STATES PATENTS

| | | | |
|---|---|---|---|
| 172,470 | 1/1876 | Morse | 285—248 |
| 974,878 | 11/1910 | Gruschow | 285—193 X |
| 1,327,106 | 1/1920 | Leahy | 285—341 |
| 2,059,920 | 11/1936 | Weatherhead | 285—247 X |
| 2,152,975 | 5/1939 | Sanford | 285—249 |
| 2,219,053 | 10/1940 | Osborn | 285—343 |
| 2,464,416 | 3/1949 | Raybould | 285—248 |
| 2,978,262 | 4/1961 | Franck | 285—248 |
| 3,158,388 | 11/1964 | Marshall | 285—242 X |

FOREIGN PATENTS

| | | |
|---|---|---|
| 981,569 | 1/1951 | France. |
| 1,309,962 | 10/1962 | France. |
| 431,918 | 7/1935 | Great Britain. |

CARL W. TOMLIN, *Primary Examiner.*